Patented Mar. 29, 1938

2,112,732

UNITED STATES PATENT OFFICE 2,112,732

IMPREGNATED MATERIAL

Hermann C. Burmeister, Hennigsdorf, Germany, assignor to General Electric Company, Schenectady, N. Y.

No Drawing. Original application July 27, 1934, Serial No. 737,315. Divided and this application August 21, 1935, Serial No. 37,185. In Germany July 27, 1933

3 Claims. (Cl. 154—2.6)

This application is a division of my copending application Serial No. 737,315, filed July 27, 1934, and assigned to the same assignee as the present invention.

My invention relates to impregnated materials adapted for use as insulators and more especially to fibrous material impregnated with artificial resins and exposed to the simultaneous action of heat and pressure.

It is an object of my invention to provide means for producing laminated and other impregnated fibrous materials having more favorable properties, as regards their use for insulating purposes, than similar materials hitherto produced.

The insulating material here in view is impregnated with condensation products obtained by the interaction of aromatic amines and aldehydes. Hitherto such condensation products have been produced by causing 1 mol. of the aromatic amine to react with 1 mol. of an aldehyde in acid solution. In this reaction is formed a soluble and fusible resin, called "lacquer resin", which cannot be rendered insoluble and infusible. If more than 1 mol. of aldehyde is made to act on 1 mol. of an aromatic amine, there are formed as a rule products that are insoluble from the beginning and the field of application of which is rather narrow.

I have now found that if fibrous material is impregnated with condensation products of this type, which are soluble, but can be converted into insoluble and infusible products and which, in contradistinction to the lacquer resins mentioned above, can be influenced by heat so that their softening point rises, the impregnated products thus obtained are capable of a far more extended technical application.

According to the present invention the resinous compounds formed in this reaction are caused to polymerize in a suitable solvent, whereby the molecule of the resin is enlarged so that the solution possesses a higher viscosity. If such a solution is then used for impregnating laminated material, tissue or the like, the greater viscosity of the solution leads to products which are superior, as far as insulating power is concerned, to similar products produced with ordinary solutions of these resins. I have found that the resinous product obtained by polymerizing the initial condensation product in a solvent composed for example of benzene and alcohol, to such extent that the resulting composition has a viscosity of at least 4° Engler at 20° C., owing to its larger molecule, does not penetrate fibrous materials as thoroughly as the ordinary impregnating solutions and, as a result, the innermost fibers are substantially free from resin. In consequence thereof the final products, more especially of laminated material, and which comprise fibrous material (for example, paper) coated and at least partly impregnated with insoluble and infusible resin such as herein described, are particularly pliable and possess great mechanical strength, of even greater importance, from the standpoint of electrical applications, possess very high dielectric properties.

I wish it to be understood that my invention is not limited to the production of laminated material, but includes as well the production of non-laminated fibrous or other material which is impregnated with a condensation product of an aromatic amine and an aldehyde, this product having been treated in solution for polymerization and the obtention of a higher degree of viscosity.

This polymerizing treatment of a resinous body is carried out preferably in a mixture of benzene and alcohol containing 50–90% benzene and 50–10% alcohol. The resinous body dissolved in this mixture is heated under the reflux condenser. The degree of polymerization can be controlled by viscosity tests. A 40% solution of the resin in the mixture of solvents shows at 20° C. a viscosity of 2° Engler. On being heated to 50–60° C. the viscosity of the solution rises slowly, as shown by determining the Engler viscosity at 20° C. of a sample of the same. The resulting product is a viscous composition consisting essentially of a solvent, composed of benzene and alcohol, and an aromatic amine-aldehyde condensation product polymerized in such solvent. For the purpose of impregnating paper or tissue I prefer using a solution of a resin polymerized to such extent that the composition has a viscosity of 4–6° Engler at 20° C. With such a solution I obtain a product which is superior to the impregnated materials of a similar kind hitherto known as regards mechanical strength and resistivity to heat. While laminated material produced by impregnating paper with similar products as hitherto produced is capable of resisting a temperature of about 100–120° C., the heat resistivity of laminated material produced in accordance with the present invention can be raised to about 170° C.

In practicing my invention I may proceed, for instance, as follows:

Example 1

30 kgs. aniline are dissolved in 300 kgs. alcohol and the solution is mixed with about 22.5 kgs. phthalic acid and 300 kgs. of a 30% formaldehyde solution, 0.25 kg. of a metal chloride such as tin-tetrachloride being added as a contact substance (catalyst). The reaction temperature rises to 48° C. and the mixture is stirred two hours, care being taken to keep the temperature at 48° C. The product of reaction is then allowed to stand about 16 hours. During this time there gradually separates out a thickly fluid resin which, at ordinary temperature, possesses a plastic viscosity and which, after settling, is separated from the mother liquor.

This resin, after having been washed with a solution of an alkali to free it from traces of acid and which is insoluble in alcohol, is now dissolved under heating in the mixture of solvents (benzene and alcohol) and heated to 50–60° C. until the viscosity has risen by polymerization to 4–6° Engler at 20° C. In certain cases I may even carry the polymerization still further, that is to say, until the solution has a viscosity at 20° C. above 6° Engler.

For impregnating fillers or webs of fibrous material the solution containing about 40–50% of the resin may be diluted according to the requirements. The impregnated material is then dried and subjected to a pressure of 150–200 kgs. cm$^2$ at a temperature of 150–160° C.

I may also use for impregnation a resinous condensation product of an aromatic amine and an aldehyde which has been formed in the presence of a mono-basic organic or inorganic acid and has then been treated for polymerization in a mixture of solvents as above described.

Example 2

93 kgs. aniline are heated under stirring in the water bath to 70° C. together with 90 kgs. glacial acetic acid and 300 liters alcohol. To this mixture are added 330 liters of a 30% aqueous formaldehyde solution. After one hour's stirring at 65° C. the soluble product separates out and can now be treated for polymerization as above described.

Example 3

A similar resinous product is obtained by heating a mixture of 19.6 kgs. hydrochloric acid of 1.19 spec. gr. with 600 kgs. alcohol and 600 kgs. of a 30% aqueous formaldehyde solution to 35° C. and adding 186 kgs. aniline under stirring. After one hour's heating to 50° C. the resinous product separates out as a plastic viscous mass, which is now treated for polymerization in a suitable mixture of solvents.

In order to avoid further polymerization during storage of a solution of the resin, the activators present in the resin, such as the acid and the contact substance (catalyst), may be removed or rendered innocuous by neutralization. I am thus enabled to stabilize against viscosity changes a resinous lacquer of predetermined viscosity. By adding acid before using such lacquer for impregnation I can restore its capacity of polymerizing or becoming insoluble or infusible.

Various changes may be made in the details disclosed in the foregoing specification without departing from the invention or sacrificing the advantages thereof.

What I claim as new and desire to secure by Letters Patent of the United States, is:

1. A strong, pliable insulating material of high dielectric strength comprising fibrous sheet material coated and partly impregnated with an insoluble and infusible resin resulting from a heat and pressure treatment of a viscous composition consisting essentially of a solvent, composed of benzene and alcohol, and an aromatic amine-aldehyde condensation product polymerized in said solvent to such extent that the resulting composition has a viscosity of at least 4° Engler at 20° C., the innermost fibers of said fibrous material being substantially free from said resin.

2. A strong, pliable laminated material of high dielectric strength comprising paper coated and at least partly impregnated with an insoluble and infusible resin resulting from a heat and pressure treatment of a viscous composition consisting essentially of a solvent, composed of benzene and alcohol in the proportion of from 50 to 90 per cent benzene to 50 to 10 per cent alcohol, and an aromatic amine-aldehyde condensation product polymerized in said solvent to such extent that the resulting composition has a viscosity of about 4° to 6° Engler at 20° C., the heat resistivity of said laminated material being of the order of about 170° C.

3. Fibrous cellulosic material coated and at least partly impregnated with an insoluble and infusible resin resulting from a heat and pressure treatment of a viscous composition having a viscosity of about 4° to 6° Engler at 20° C. and comprising a condensation product of an aromatic amine and an aldehyde polymerized in a solvent composed of benzene and alcohol to the stated viscosity, said fibrous material being resistant to a heat as high as about 170° C.

HERMANN C. BURMEISTER.

CERTIFICATE OF CORRECTION.

Patent No. 2,112,732.  March 29, 1938.

HERMANN C. BURMEISTER.

It is hereby certified that error appears in the printed specification of the above numbered patent requiring correction as follows: Page 1, second column, line 11, before "of" insert the word but; page 2, first column, line 30, for "kgs. cm$^2$" read kgs./cm$^2$; and that the said Letters Patent should be read with these corrections therein that the same may conform to the record of the case in the Patent Office.

Signed and sealed this 10th day of May, A. D. 1938.

(Seal)

Henry Van Arsdale,
Acting Commissioner of Patents.